A. AND H. PRIEBE.
HEATER FOR AUTOMOBILE RADIATORS.
APPLICATION FILED NOV. 22, 1920.
1,388,300. Patented Aug. 23, 1921.
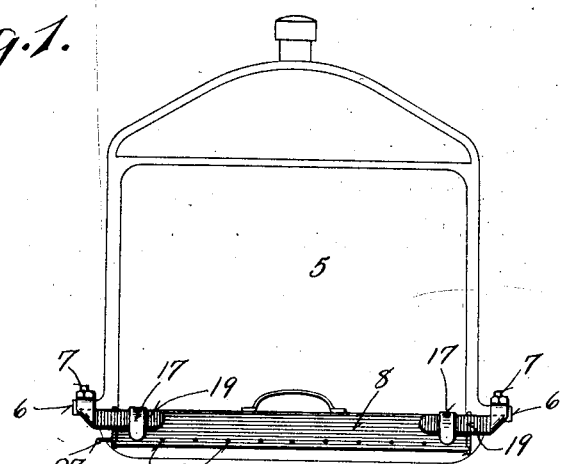
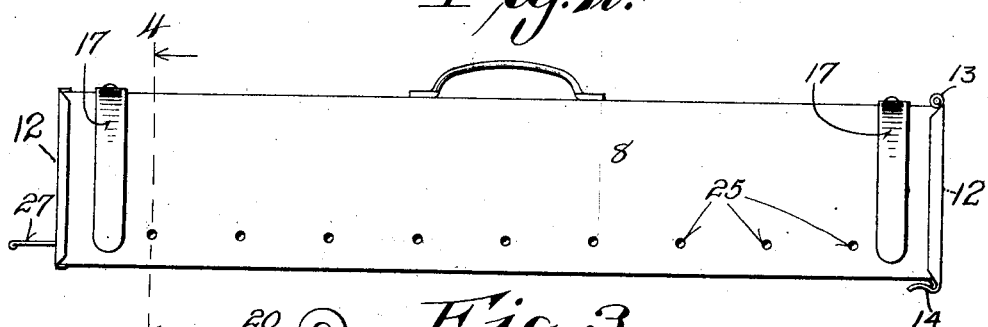
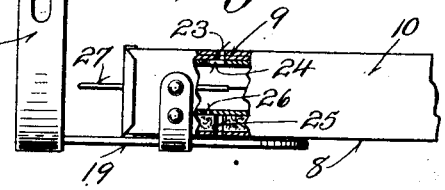
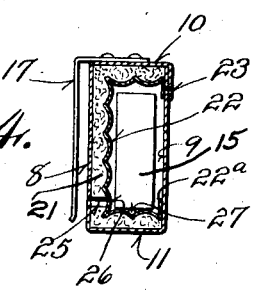
WITNESS:
T. P. Britt
INVENTORS
Amondus Priebe
Hubert Priebe
BY
Young & Young
ATTORNEYS

UNITED STATES PATENT OFFICE.

AMANDUS PRIEBE AND HUBERT PRIEBE, OF ANTIGO, WISCONSIN.

HEATER FOR AUTOMOBILE-RADIATORS.

1,388,300.  Specification of Letters Patent.  Patented Aug. 23, 1921.

Application filed November 22, 1920. Serial No. 425,931.

*To all whom it may concern:*

Be it known that we, AMANDUS PRIEBE and HUBERT PRIEBE, both citizens of the United States, and residents of Antigo, in the county of Langlade and State of Wisconsin, have invented certain new and useful Improvements in Heaters for Automobile-Radiators; and we do hereby declare that the following is a full, clear, and exact description thereof.

Our invention relates to new and useful improvements in heaters for automobile radiators whereby to prevent damage to the radiator by freezing when the automobile is standing idle during very cold weather.

It is primarily the object of our invention to provide a heater of this nature which will utilize charcoal or other similar prepared fuel whereby a slow burning action may be procured to distribute an adequate amount of heat to prevent freezing over a considerable period of time.

It is more particularly the object to provide a mounting for a device of this character which may be most readily attached to various types of automobiles, and which provides for a most ready attachment or detachment of the heater member. A further and important object is to provide, with a maximum structural economy, means for regulating the combustion of fuel in the heater, by controlling passage of air therethrough, and to this end, inasmuch as we contemplate a heat insulating lining for the burner chamber having a shield facing, it is more particularly our object to utilize the shield as a valve member controlling passage of air through the inlet ports of the chamber.

With the above and other objects and advantages in view, our invention resides more particularly in the novel combination, formation and arrangement of parts, more fully hereinafter described and particularly pointed out in the appended claims.

In the accompanying drawings:

Figure 1 is a front elevational view of an automobile radiator, with our improved heating device attached thereto.

Fig. 2 is a front elevational view of the heater casing.

Fig. 3 is a top plan view of one end portion of the heater casing and its attaching member, the top wall of the casing being broken away at one point.

Fig. 4 is a transverse sectional view through the heater on the line 4—4 of Fig. 2.

Referring now more particularly to the accompanying drawings, 5 designates conventionally the radiator of an automobile, the frame of which is provided at its lower portion with the usual outstanding ledges 6 from which project upwardly the usual securing bolts 7 and in the attachment of our device these securing bolts form the sole fastening means of the device to the conventional automobile structure, whereby the device may be secured on an automobile in a most ready manner.

Our improved heater comprises a casing, having the front and rear walls 8 and 9 respectively, top and bottom walls 10 and 11 and end walls 12, one of said end walls being connected with the major portion of the casing by a hinge 13 at its upper edge and having a spring clip 14 at its lower edge engageable with the bottom wall 11 whereby the casing may be readily opened for the insertion of a block 15 of charcoal or other prepared fuel which will afford a slow but positive combustion under the conditions present in the casing. The casing is of a length approximating the width of the foraminous front portion of the radiator.

For detachably securing the casing at the lower forward portion of the radiator, with its inner or rear wall 9 in juxtaposition to the radiator facing, a pair of clip arms 17 are provided having upper ends angularly bent and secured transversely on the end portions of the top wall 10, the major portions of said arms extending transversely of and slightly spaced from the front wall 8 of the casing. Secured on each of the bolts 7 of the radiator structure is an arm 18 of an angular strap metal bracket bar, whose other arm 19 extends inwardly at the front of the radiator in a vertical plane and is adapted for hook engagement between the corresponding clip arm 17 and the front wall of the casing, to support the casing and hold it against the foraminous front portion of the radiator, a snug fit being procured by reason of the natural resiliency of the strap metal bracket arm 19 and clip arm 17, and by adjustment of the arm 19 toward and away from the face of the radiator, this adjustment being permitted by a longitudinal slot 20 in the bracket arm 18 receiving the radiator bolt 7. Each of the brackets is preferably formed from a single length of metal to which is imparted a quarter twist at its intermediate portion, the arm 18 extending at right angles from said twist whereby the arms of the bracket lie in intersecting planes.

An exceedingly ready means of adjustment has thus been provided, both with respect to initial association of the device with an automobile structure, and with respect to removal of the burner casing for cranking the automobile in the event that this is necessary, and for replenishing and inspecting the fuel. To insure application of the heat generated in the casing to the radiator, the top, bottom, front and end walls of the casing are provided with a lining 21 of asbestos or any suitable heat insulating material. This lining is faced with a corrugated facing plate 22 bent in longitudinal lines to provide top, bottom and outer wall facing portions, the length of this plate being slightly less than the length of the casing whereby it may have limited sliding movement longitudinally therein, and it is noted that the side edge portions of the plate are directed inwardly at 22ᵃ and slidably fit against the inner wall 9 of the casing whereby the plate is snugly held against movement in any other direction. Along the upper portion of the rear wall 9 there is provided a series of vent ports 23, and the upper bent edge portion of the facing plate is provided with openings 24 elongated longitudinally of the casing whereby movement of the plate will not interfere with free passage of air through said ports. A series of inlet ports 25 are provided along the lower portion of the front wall 8, these ports being continued through the insulation lining 21, and the adjacent portions of the facing plate 22 are provided with ports 26 adapted to align with the ports 25, the plate 22 thus also serving the function of a valve member, whereby longitudinal movement of said plate will control the amount of air permitted to pass through the ports 25 into the combustion chamber, and may if desired shut off the supply of air entirely. This movement of the plate is effected by means of a stem 27 secured to the facing plate and slidably passed through the fixed end wall 12.

What is claimed is:

1. An automobile radiator heater including a casing adapted to contain prepared fuel, a heat insulating lining for the front, top and bottom walls of the casing, a facing plate for said lining mounted for sliding movement in the casing and provided with ports, inlet ports through the casing and lining and adapted for registry with the ports of the plate, and means for sliding the plate in the casing to cover or uncover the ports in the casing.

2. An automobile radiator heater comprising a casing adapted to contain prepared fuel, means for securing the casing against the front face of a radiator, a series of outlet ports in the upper portion of the rear wall of the casing, a series of inlet ports in the lower portion of the front wall of the casing, a face plate inside the casing and extending across the front, top and bottom sides thereof and having flanges facing the top and bottom portions of the rear side of the casing, inlet ports in the lower portion of the front wall of the plate, means for sliding the plate in the casing to cause the inlet ports thereof to cover or uncover the inlet ports of the casing and slots in the upper rear flange in alinement with the outlet ports of the casing.

3. An automobile radiator heater including a casing adapted to contain prepared fuel, a heat insulating lining for the front, top and bottom walls of the casing, a series of inlet ports in the lower portion of the front wall of the casing and lining, a facing plate for said lining and having flanges facing the top and bottom portions of the rear side of the casing, inlet ports in the plate adapted to register with the first named inlet ports, means for sliding the plate in the casing to cover or uncover said ports, and outlet ports through the upper portion of said plate and casing.

In testimony that we claim the foregoing we have hereunto set our hands at Antigo, in the county of Langlade and State of Wisconsin.

AMANDUS PRIEBE.
HUBERT PRIEBE.